US010032456B2

(12) United States Patent
Breedvelt-Schouten et al.

(10) Patent No.: US 10,032,456 B2
(45) Date of Patent: Jul. 24, 2018

(54) AUTOMATED AUDIO DATA SELECTOR

(71) Applicant: INTERNATIONAL BUSINESS MACHINES CORPORATION, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US); John A. Lyons, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 15/238,790

(22) Filed: Aug. 17, 2016

(65) Prior Publication Data

US 2018/0053511 A1 Feb. 22, 2018

(51) Int. Cl.
*G10L 19/12* (2013.01)
*G10L 17/02* (2013.01)
*G10L 21/0272* (2013.01)
*G10L 25/93* (2013.01)

(52) U.S. Cl.
CPC .......... *G10L 17/02* (2013.01); *G10L 21/0272* (2013.01); *G10L 25/93* (2013.01)

(58) Field of Classification Search
None
See application file for complete search history.

(56) References Cited

U.S. PATENT DOCUMENTS

| 7,310,517 | B2 | 12/2007 | Wolff et al. | |
|---|---|---|---|---|
| 8,417,233 | B2 | 4/2013 | Woloshyn | |
| 8,676,273 | B1* | 3/2014 | Fujisaki | H04M 1/6505 379/142.06 |
| 9,817,634 | B2* | 11/2017 | Gupta | G06F 3/167 |
| 2009/0251440 | A1* | 10/2009 | Edgecomb | G06F 3/03545 345/179 |
| 2009/0306981 | A1 | 12/2009 | Cromack et al. | |
| 2016/0019026 | A1* | 1/2016 | Gupta | G06F 3/167 704/233 |

(Continued)

OTHER PUBLICATIONS

Peter Mell et al, The NIST Definition of Cloud Computing, National Institute of Standards and Technology, Publication 800-145, 2011.

(Continued)

*Primary Examiner* — Satwant Singh
(74) *Attorney, Agent, or Firm* — Patrick J. Daugherty; Driggs, Hogg, Daugherty & Del Zoppo Co., LPA

(57) ABSTRACT

Aspects define a capture signal as audio inputs by a user of word content. An input of the capture signal word content is recognized in response to an audio input of the user reciting the capture signal word content into a microphone in communication with the recording device during a recording of a speech presentation by the recording device. A recording portion start time is identified that is prior to a time of the input of the capture signal during the current recording of the audio speech presentation in response to recognizing the input of the capture signal word content from the user. The recording device is driven to capture a portion of the recorded audio speech presentation over a period of time spanning from the recording portion start time to the time of the input of the capture signal word content.

20 Claims, 4 Drawing Sheets

(56) References Cited

U.S. PATENT DOCUMENTS

2016/0124702 A1* 5/2016 Edgecomb .......... G06F 3/03545
345/179

OTHER PUBLICATIONS

Blackboard Collaborate Web Conferencing, Microphone Configuration, http://library.blackboard.com, 2016.
Blue Microphones, Blue, Yeti, http://www.bluemic.com, 2016.
Blue Microphones, Snowball USB Microphone User guide, cd.bluemic.com.s3.amazonaws.com/pdf/snowball/manual.pdf, 2009.
Sadaoki Furui, Speaker recognition, http://www.scholarpedia.org/article, 2008.
IBM, Pioneering Speech Recognition, http://www-03.ibm.com/ibm/history/ibm100/us/en-icons, 2016.

* cited by examiner

AUTOMATED AUDIO DATA SELECTOR

BACKGROUND

It is common to create audio recordings of speaker presentations, dictated notes and observations, and multi-person conversations, interviews, meetings, etc. The audio recordings of a given event may include one or more digital audio data files or analog media, such as magnetic tape and vinyl record recordings.

While recording a given event may be easy, making effective use of the recording may be difficult. The longer the time of the event, the greater the amount of recording data that must be obtained and subsequently reviewed in order to recover desired information from the event via the recording. Accordingly, the efficiencies involved with reviewing audio recordings of an event in order to subsequently identify and retrieve information of interest diminish in proportion to the amount the recording data. In the case of a recording that includes audio recorded from multiple persons, distinguishing the content from any one person may also be difficult.

BRIEF SUMMARY

In one aspect of the present invention, a method for the automated generation of audio selections includes defining a capture signal as an audio input into a microphone of a recording device of a recitation by a user of word content (a specific word or a phrase of multiple specific words). An input of the capture signal word content to a recording device is recognized in response to an audio input of the user reciting the capture signal word content into a microphone in communication with the recording device during a recording of a speech presentation by the recording device. A recording portion start time is identified that is prior to a time of the input of the capture signal during the current recording of the audio speech presentation in response to recognizing the input of the capture signal word content from the user. The recording device is thus driven to capture a portion of the recorded audio speech presentation over a period of time spanning from the recording portion start time to the time of the input of the capture signal word content.

In another aspect, a system has a hardware processor in circuit communication with a computer readable memory and a computer-readable storage medium having program instructions stored thereon. The processor executes the program instructions stored on the computer-readable storage medium via the computer readable memory and thereby defines a capture signal as an audio input into a microphone of a recording device of a recitation by a user of word content (a specific word or a phrase of multiple specific words). An input of the capture signal word content to a recording device is recognized in response to an audio input of the user reciting the capture signal word content into a microphone in communication with the recording device during a recording of a speech presentation by the recording device. A recording portion start time is identified that is prior to a time of the input of the capture signal during the current recording of the audio speech presentation in response to recognizing the input of the capture signal word content from the user. The recording device is thus driven to capture a portion of the recorded audio speech presentation over a period of time spanning from the recording portion start time to the time of the input of the capture signal word content.

In another aspect, a computer program product for the automated generation of audio selections has a computer-readable storage medium with computer readable program code embodied therewith. The computer readable hardware medium is not a transitory signal per se. The computer readable program code includes instructions for execution which cause the processor to define a capture signal as an audio input into a microphone of a recording device of a recitation by a user of word content (a specific word or a phrase of multiple specific words). An input of the capture signal word content to a recording device is recognized in response to an audio input of the user reciting the capture signal word content into a microphone in communication with the recording device during a recording of a speech presentation by the recording device. A recording portion start time is identified that is prior to a time of the input of the capture signal during the current recording of the audio speech presentation in response to recognizing the input of the capture signal word content from the user. The recording device is thus driven to capture a portion of the recorded audio speech presentation over a period of time spanning from the recording portion start time to the time of the input of the capture signal word content.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
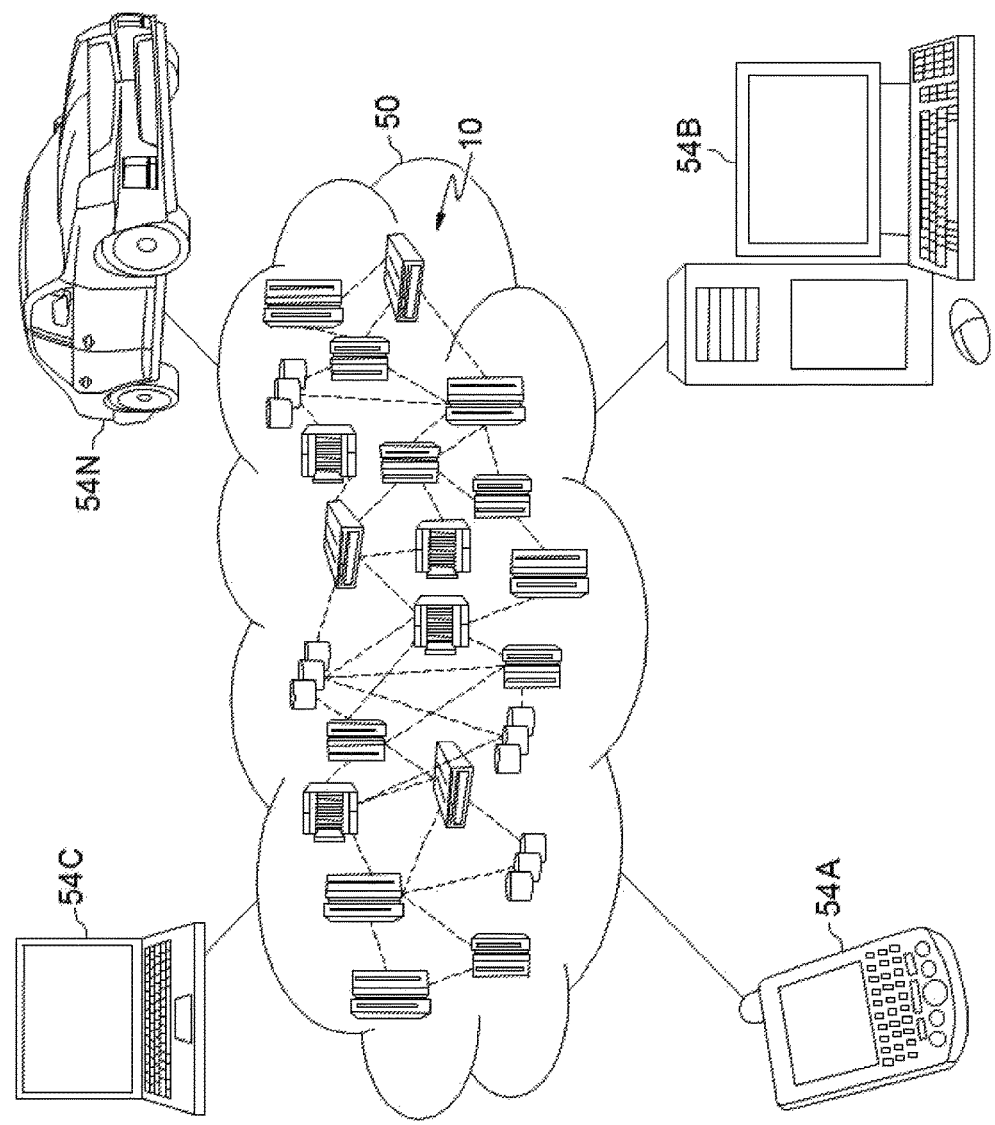
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
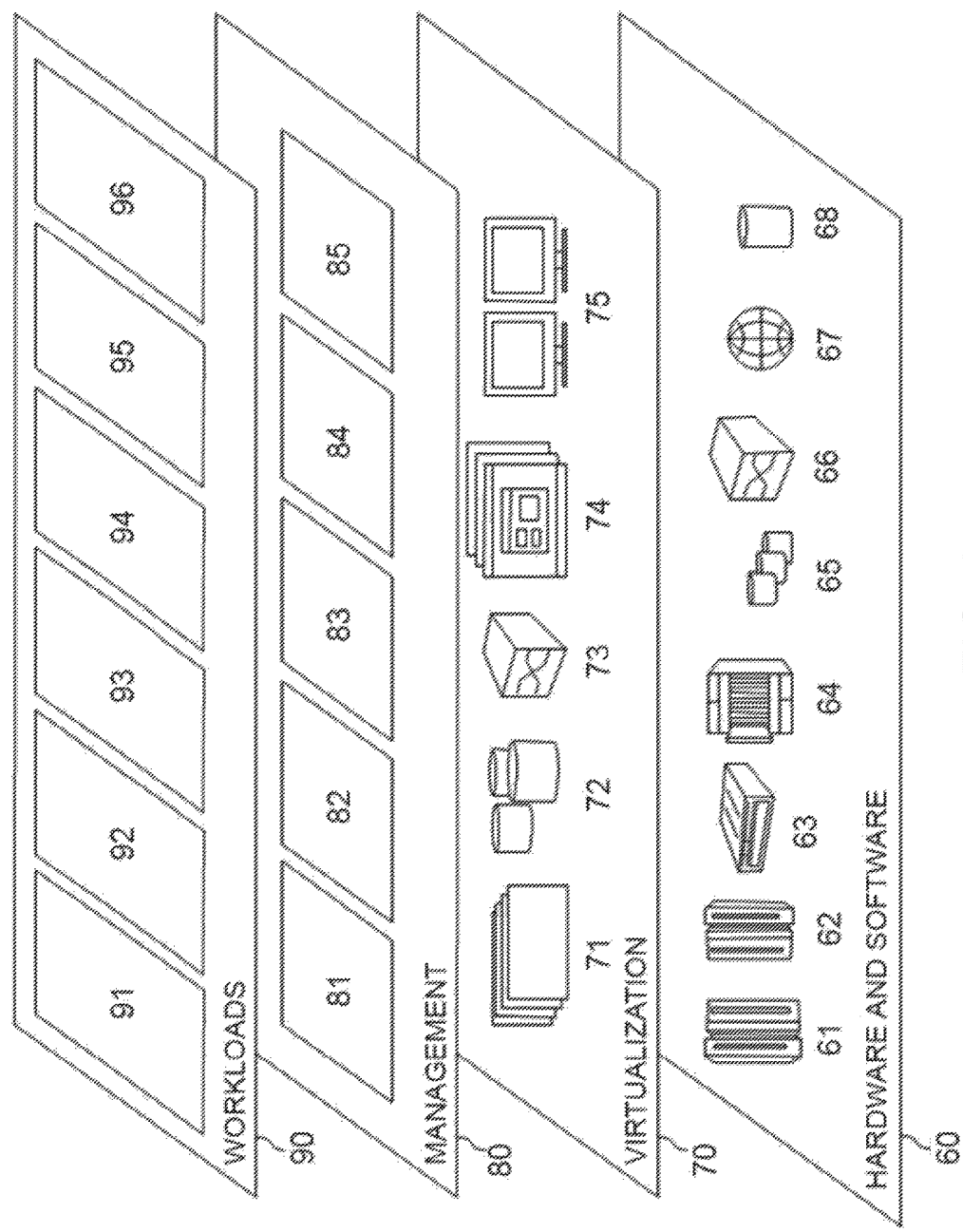
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
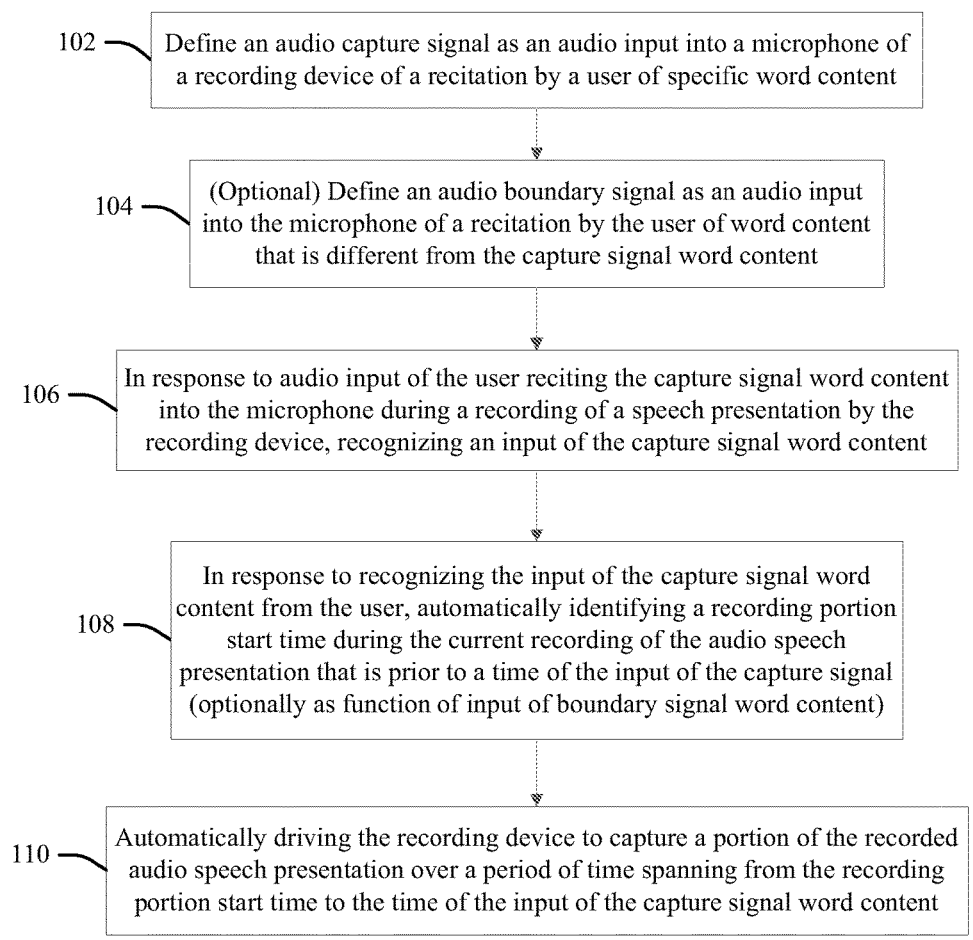
FIG. 4 is a flow chart illustration of a process or system for the automated generation of audio selections according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 according to embodiments for the automated generation of audio selections as depicted in FIG. 4 and described below.

Figure 3:
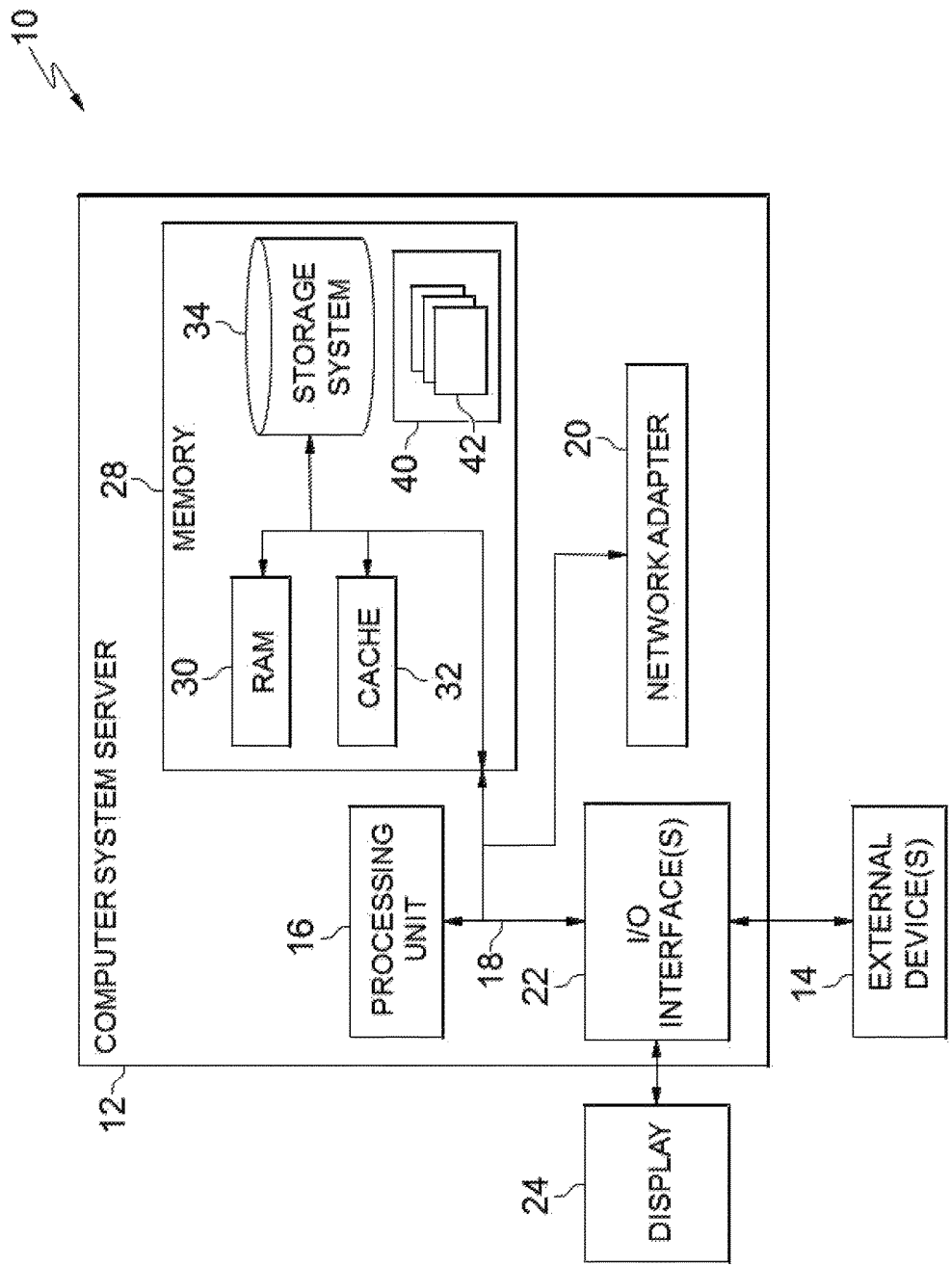
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention for the automated generation of audio selections in response to speaker or topic content. At 102 a user defines an audio capture signal within a programmable recording device according to the present invention as an audio input of word content recited by the user into a microphone in communication with the recording device. The capture signal word content comprises a specific word or a phrase of multiple, specific words that are distinguishable by the recording device from other words spoken by the user or other users. More particularly, the recording device is configured to identify certain spoken responses or remarks of interest being captured within an audio recording during a time prior to and contemporaneous with an input of the capture signal.

In optional steps or processes within some embodiments of the present invention, at 104 the user defines an initial or ending audio boundary signal as another recitation by the user (via audio input into the microphone) of a different specific word or phrases that is distinguishable by the recording device from the capture signal word(s) and from other words spoken by the user or other users.

At 106 during a recording of audio speech presentation by one or more other people by a recording device according to the present invention, the user recites the specific word or words of the defined capture signal into a microphone in communication with the recording device.

At 108, in response to recognizing (identifying) an input of the capture signal from the user (as spoken by the user at 106), the recording device automatically identifies a recording portion start time during the current recording of the audio speech presentation that is prior to a time of the input of the capture signal. Aspects identify the recording portion start time through a variety methods and processes, and illustrative but not limiting or exhaustive examples include by a specified period of time prior to the input of the capture signal; as a point in time at which a speaker recognized within audio content at the time of the input of the capture signal of the audio speech presentation first starts speaking prior to the time of the input of the capture signal; or as a point in time at which a specified modifying word content first occurs in the recording of the speech presentation prior to the time of the input of the capture signal. Aspects may also determine the recording portion start time as function of an input of the user reciting boundary signal word content, as is discussed more fully below.

At 110 the process captures a portion of the recorded audio speech presentation that spans backward in time from the input of the capture signal to an initial, beginning time defined by the recording portion start time determined at 108. In some examples the recording portion also spans forward in time from the capture signal. Thus, aspects at 110 generate an output of the captured audio portion that is associated with the capture signal input from the user. Generally different inputs of the capture signal each generate different captured audio portions that are each associated uniquely therewith, wherein the different capture signal inputs are distinguished via having different unique time stamp data of times of their input at 106, and still other methods for distinguishing the different capture signals will be apparent to one skilled in the art.

In some embodiments recording portion start time is identified at 108 by a specified, fixed period of time relative to the capture signal input time. For example, the recording device may be configured to the go back fifteen (15) seconds, thirty (30) seconds, one minute, five minutes, or some other user-specified period in time from the time of the capture signal input, and in some cases to also go forward to capture additional speech data occurring after the time of the capture signal input.

Aspects also identify the recording portion start time at 108 by analyzing a sampling portion of the recorded audio occurring immediately previous in time to the time of the capture signal input to uniquely distinguish and recognize a speaker generating recorded audio speech data most recently prior to the time of the capture signal input, relative to speech data recorded from the user generating the capture signal and from any other speaking voices present on the audio data over the sampling period. Such aspects review the recorded data leading up to the time of the capture signal input to determine a point in time at which the distinguished and recognized speaker first started speaking, and uses this point in time as the recording portion start time. Thus, such embodiments recognize the speaker and back up to a point where the speaker begins to speak.

Specific context word content spoken by the user in a pre-defined proximity to the capture signal words may also be used by the recording device to determine the recording portion start time and thereby the span of the captured audio portion. Proximity may be defined in terms of time, or in terms of number of other spoken words between the specific context word content and the capture signal words, as determined via text-to-speech analysis of the recorded audio, and still other techniques will be apparent to one skilled in the art. Some aspects automatically associate another person's name spoken by the user immediately before or after, or within a specified number of words or time period of, the capture signal to identify that the beginning or ending times for the captured portion should correlate with the times that the identified person starts or stops talking, over a time period inclusive of the time of the capture signal input.

For example, if the capture signal is the phrase "good point," and the user says "good point, Janet," some aspects recognize that Janet is the speaker to be used to define to recording portion start time of the captured portion, and go back in time to a point at which Janet first begins to speak (and in some aspects forward to a time after the time of the input of the capture signal where Janet stops speaking, in response to determining that said speaker continues to speak after the time of the capture signal input. Such aspects may override the automatic determinations made via proximity to the capture signal as described above: for example, if Janet has paused while talking, and John says something immediately prior to the time of the capture signal input, rather than use John's speech to define the captured portion, this aspect is signaled by the recitation of Janet's name immediately after the capture signal to instead use the speech audio by Janet to define the captured audio portion.

A variety of techniques may be practiced to determine a point in time at which a recognized speaker first starts speaking, or stops speaking. For example, a threshold pause period may be defined wherein if review off the recorded data finds a break in a continuous speech by the speaker for a time period greater than the threshold pause period then the aspects determine that the speakers has stopped speaking.

In some aspects the recording device uses the initial audio boundary signals optionally defined (at 104, FIG. 4) in combination with the capture signal to determine the stopping point for going back in time from the time of the capture signal input to capture audio selection portion data within an audio recording during time prior to and contemporaneous with an input of the audio signal. The recording device may also use the ending audio boundary signal in combination with the capture signal to determine a stopping point for going forward in time from the time of the capture signal input to capture audio selection portion data within an audio recording during time prior to and contemporaneous with an input of the audio signal. Thus, the initial and ending boundary signals may be used to define beginning and ending times of a captured audio selection portion inclusive of the time of the capture signal input.

The boundary signals may be defined as specific words or phrases that the system uses to modify the automatic portion capture times and definition. For example, a phrase "with regard to" may be a boundary signal that, when used in combination with the capture signal overrides default portion definitions with respect to an associated modifying word content. Thus, "good point Janet with regard to the green widget" may be recognized as a sequential combination of the defined capture signal word content ("good point"), speaker identification content ("Janet"), the boundary signal content ("with regard to") and modifying word content ("green widget"). In response, a recording device according to the present invention captures an audio data portion from speech data generated by Janet from the earliest point in time at which the modifying word content (the "green widget") is found within the recorded data.

Aspects may also extend the recording time, or limit it, to a period covering discussion of the green widget, perhaps excluding other speech data from Janet that is contemporaneous (immediately before or after) the discussion of the green widget.

Aspects may also extend a capture period defined from the recording portion start time to the time of the input of the capture signal by some specified additional tolerance or buffer time period, to thereby capture contextual discussions occurring before or after the time portion as well.

Aspects of the recording device may define the audio capture and boundary signals in association with unique voice profile data of the user defining the signals, wherein said unique voice profile data enables the recording device to distinguish spoken word audio data received from the user via microphone inputs from other spoken word audio data received from another speaker via microphone inputs. Thus, in these examples the audio signals are only recognized when the user speaks their associated word content them into a microphone input, and not in response to being spoken by any other person. These embodiments are useful for recordings generated from inputs from a common microphone, or from multiple microphones.

Some aspects may use other signals or inputs to initiate or limit the audio capture features, such as a toggle or button on a microphone that may be used to manually signal the recording device to begin or end the processes described above.

Some aspects acquire the audio data prior in time to the input of the capture signal by buffering the recording of the audio data, and only saving the relevant portions when the user signals the device appropriately.

At the conclusion of an event, conversation, meeting, etc. from which the audio data is generated, the user may easily capture the audio file and send it to another person, or to a storage device locally, on a network or in the cloud, or post it on a social network service, etc. The user may also convert the audio portion to text via a speech-to-text application and send the text data to another person or storage device, post it, etc.

Some aspects may also be applied to audio data recorded and transformed to text via a speech-to-text application. Thus, when the capture signal ("good point") appears in the transcribed text, aspects of the present invention may analyze the transcribed text to select a portion of the text that is relevant (generate by) an audience member or other speaker that generated the speech data resulting in the text material appearing immediately before the occurrence of the capture signal words in the transcription. The boundary signals or other capture portion variations described above may likewise be applied to the text transcription to generate a desired capture portion of the entire event transcription.

Thus, aspects of the present invention quickly and efficiently enable a speaker to an audience to accurately generate notes from captured audio portions designated by the user of interest, via initiating the creation of the portions through affirmative capture signal inputs. It is difficult in the prior art for a presentation speaker to take notes during the presentation. During interactions with audience members people of interest may comment or speak to the presenter or the general audience, or questions or answers from the audience may be of interest to the speaker or otherwise desirable for memorializing (potential actions, ideas to pursue or follow-up on, additional research to consider, etc.). However, it is generally difficult for the speaker to stop his or her presentation long enough to take notes to memorialize the items or people of interest, or notes thereon. While the prior art enables recording of an entire presentation, or of a selection going forward into the future after initialization of a recording (pushing a record button, etc.), for later review by the speaker, such approaches either generate too much data (the entire presentation), or miss items of interest (the discussions leading up to the pushing of the record button).

In contrast, aspects of the present invention enable capturing of portions of an on-going speech or conversation in response to speaker-generated capture signals that go back in time just far enough to capture relevant points. Aspects may be used and deployed via subtle signals that do not interrupt the flow of the presentation, and enable a speaking user to continue to make a presentation without disrupting their thought process, or that of the listening audience.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for the automated generation of audio selections, comprising executing on a computer processor:

defining a capture signal as an audio input into a microphone of a recording device of a recitation by a user of word content that is selected from the group consisting of a specific word, and a phrase of multiple specific words;

in response to an audio input of the user reciting the capture signal word content into a microphone in communication with a recording device during a recording of a speech presentation by the recording device, recognizing an input of the capture signal word content to the recording device, wherein spoken content by a plurality of people including the user is audible within audio data recorded by the recording device from the speech presentation;

in response to recognizing the input of the capture signal word content from the user, analyzing a sampling portion of the recorded audio speech presentation that occurs immediately previous in time to the time of the input of the capture signal word content, to uniquely distinguish and recognize a speaker generating recorded audio speech data most recently prior to the time of the input of the capture signal word content, relative to speech data recorded from the user generating the capture signal and from any other speaking voices present on the audio data over the sampling period, wherein the recognized speaker is different from the user;

reviewing the recorded audio speech presentation;

identifying a recording portion start time during the current recording of the audio speech presentation that is prior to a time of the input of the capture signal as a point in time that is prior to the time of the input of the capture signal word content at which the recognized speaker first started speaking;

driving the recording device to capture a portion of the recorded audio speech presentation over a period of time spanning from the recording portion start time to the time of the input of the capture signal word content; and generating an output of the captured audio portion in association with the capture signal input from the user.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the defining the capture signal, the recognizing the input of the capture signal word content to the recording device in response to the audio input of the user reciting the capture signal word content into the microphone during the recording of the speech presentation, the analyzing the sampling portion of the recorded audio speech presentation to uniquely distinguish and recognize a speaker generating recorded audio speech data most recently prior to the time of the input of the capture signal word content in response to recognizing the input of the capture signal word content from the user, the reviewing the recorded audio speech presentation, the identifying the recording portion start time during the current recording of the audio speech presentation as the point in time that is prior to the time of the input of the capture signal word content at which the recognized speaker first started speaking, the driving the recording device to capture the portion of the recorded audio speech presentation over the period of time spanning from the recording portion start time to the time of the input of the capture signal word content, and the generating the output of the captured audio portion in association with the capture signal input from the user.

3. The method of claim 2, wherein the computer-readable program code is provided as a service in a cloud environment.

4. The method of claim 1, further comprising:

determining the recording portion start time as a time occurring a specified, fixed period of time prior to the time of the input of the capture signal word content.

5. The method of claim 1, further comprising:

in response to generating the output of the captured audio portion in association with the capture signal input from the user, executing an action that is selected from the group consisting of sending the generated output to another person, sending the generated output to a local storage device, posting the generated output on a social network service, converting the captured audio portion of the generated output to text via a speech-to-text application, and sending the generated output to another storage device that is located on a network or in a cloud.

6. The method of claim 1, further comprising:

selecting the recognized speaker from a plurality of speakers of which their voices are each present on the audio data over the sampling period, in response to word content of an audio input of the user reciting the name of the recognized speaker within a specified proximity to the capture signal word content.

7. The method of claim 1, further comprising:

defining an audio boundary signal as an audio input into the microphone of a recitation by the user of word content that is different from the capture signal word content and is selected from the group consisting of another specific word, and another phrase of multiple words;

in response to an audio input of the user reciting the boundary signal word content into the microphone during the recording of the speech presentation and within a specified proximity in time to the time of the input of the capture signal word content, identifying word content occurring after the boundary signal word content within the recording of the speech presentation as modifying word content; and reviewing the recorded audio speech presentation to identify the recording portion start time as a point in time prior to the time of the input of the capture signal word content at which the modifying word content first occurs in the recording of the speech presentation.

8. The method of claim 7, further comprising:

analyzing a sampling portion of the recorded audio speech presentation that occurs immediately previous in time to the time of the input of the capture signal word content to uniquely distinguish and recognize a speaker generating recorded audio speech data most recently prior to the time of the input of the capture signal word content, relative to speech data recorded from the user generating the capture signal and from any other speaking voices present on the audio data over the sampling period, wherein the recognized speaker is different from the user;

reviewing the recorded audio speech presentation to identify a point in time that is prior to the time of the input of the capture signal word content at which the recognized speaker first started speaking; and identifying the recording portion start time as the point in time at which the modifying word content first occurs in the recording of the speech presentation in response to determining that the point in time at which the recognized speaker first started speaking is subsequent in time to the point in time at which the modifying word content first occurs in the recording of the speech presentation.

9. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

defines a capture signal as an audio input into a microphone of a recording device of a recitation by a user of word content that is selected from the group consisting of a specific word, and a phrase of multiple specific words;

in response to an audio input of the user reciting the capture signal word content into a microphone in communication with a recording device during a recording of a speech presentation by the recording device, recognizes an input of the capture signal word content to the recording device, wherein spoken content by a plurality of people including the user is audible within audio data recorded by the recording device from the speech presentation;

in response to recognizing the input of the capture signal word content from the user, analyzes a sampling portion of the recorded audio speech presentation that occurs immediately previous in time to the time of the input of the capture signal word content, to uniquely distinguish and recognize a speaker generating recorded audio speech data most recently prior to the time of the input of the capture signal word content, relative to speech data recorded from the user generating the capture signal and from any other speaking voices present on the audio data over the sampling period, wherein the recognized speaker is different from the user;

reviews the recorded audio speech presentation;

identifies a recording portion start time during the current recording of the audio speech presentation that is prior to a time of the input of the capture signal as a point in time that is prior to the time of the input of the capture signal word content at which the recognized speaker first started speaking;

drives the recording device to capture a portion of the recorded audio speech presentation over a period of time spanning from the recording portion start time to the time of the input of the capture signal word content; and generates an output of the captured audio portion in association with the capture signal input from the user.

10. The system of claim 9, wherein the processor executes the program instructions stored on the computer-readable storage medium via the computer readable memory and thereby determines the recording portion start time as a time occurring a specified, fixed period of time prior to the time of the input of the capture signal word content.

11. The system of claim 9, wherein the processor executes the program instructions stored on the computer-readable storage medium via the computer readable memory and thereby:

executes an action that is selected from the group consisting of sending the generated output to another person, sending the generated output to a local storage device, posting the generated output on a social network service, converting the captured audio portion of the generated output to text via a speech-to-text application, and sending the generated output to another storage device that is located on a network or in a cloud.

12. The system of claim 9, wherein the processor executes the program instructions stored on the computer-readable storage medium via the computer readable memory and thereby selects the recognized speaker from a plurality of speakers of which their voices are each present on the audio data over the sampling period, in response to word content of an audio input of the user reciting the name of the recognized speaker within a specified proximity to the capture signal word content.

13. The system of claim 9, wherein the processor executes the program instructions stored on the computer-readable storage medium via the computer readable memory and thereby:

defines an audio boundary signal as an audio input into the microphone of a recitation by the user of word content that is different from the capture signal word content and is selected from the group consisting of another specific word, and another phrase of multiple words;

in response to an audio input of the user reciting the boundary signal word content into the microphone during the recording of the speech presentation and within a specified proximity in time to the time of the input of the capture signal word content, identifies word content occurring after the boundary signal word content within the recording of the speech presentation as modifying word content; and reviews the recorded audio speech presentation to identify the recording portion start time as a point in time prior to the time of the input of the capture signal word content at which the modifying word content first occurs in the recording of the speech presentation.

14. The system of claim 13, wherein the processor executes the program instructions stored on the computer-readable storage medium via the computer readable memory and thereby:

analyzes a sampling portion of the recorded audio speech presentation that occurs immediately previous in time to the time of the input of the capture signal word content to uniquely distinguish and recognize a speaker generating recorded audio speech data most recently prior to the time of the input of the capture signal word content, relative to speech data recorded from the user generating the capture signal and from any other speaking voices present on the audio data over the sampling period, wherein the recognized speaker is different from the user;

reviews the recorded audio speech presentation to identify a point in time that is prior to the time of the input of the capture signal word content at which the recognized speaker first started speaking; and identifies the recording portion start time as the point in time at which the modifying word content first occurs in the recording of the speech presentation in response to determining that the point in time at which the recognized speaker first started speaking is subsequent in time to the point in time at which the modifying word content first occurs in the recording of the speech presentation.

15. A computer program product for the automated generation of audio selections, the computer program product comprising:

a computer readable storage medium having computer readable program code embodied therewith, wherein the computer readable storage medium is not a transitory signal per se, the computer readable program code comprising instructions for execution by a processor that cause the processor to:

define a capture signal as an audio input into a microphone of a recording device of a recitation by a user of word content that is selected from the group consisting of a specific word, and a phrase of multiple specific words;

in response to an audio input of the user reciting the capture signal word content into a microphone in communication with a recording device during a recording of a speech presentation by the recording device, recognize an input of the capture signal word content to the recording device, wherein spoken content by a plurality of people including the user is audible within audio data recorded by the recording device from the speech presentation;

in response to recognizing the input of the capture signal word content from the user, analyze a sampling portion of the recorded audio speech presentation that occurs immediately previous in time to the time of the input of the capture signal word content, to uniquely distinguish and recognize a speaker generating recorded audio speech data most recently prior to the time of the input of the capture signal word content, relative to speech data recorded from the user generating the capture signal and from any other speaking voices present on the audio data over the sampling period, wherein the recognized speaker is different from the user;

review the recorded audio speech presentation;

identify a recording portion start time during the current recording of the audio speech presentation that is prior to a time of the input of the capture signal as a point in time that is prior to the time of the input of the capture signal word content at which the recognized speaker first started speaking;

drive the recording device to capture a portion of the recorded audio speech presentation over a period of time spanning from the recording portion start time to the time of the input of the capture signal word content; and generate an output of the captured audio portion in association with the capture signal input from the user.

16. The computer program product of claim 15, wherein the computer readable program code instructions for execution by the processor further cause the processor to determine the recording portion start time as a time occurring a specified, fixed period of time prior to the time of the input of the capture signal word content.

17. The computer program product of claim 15, wherein the computer readable program code instructions for execution by the processor further cause the processor to:

execute an action that is selected from the group consisting of sending the generated output to another person, sending the generated output to a local storage device, posting the generated output on a social network service, converting the captured audio portion of the generated output to text via a speech-to-text application, and sending the generated output to another storage device that is located on a network or in a cloud.

18. The computer program product of claim 15, wherein the computer readable program code instructions for execution by the processor further cause the processor to select the recognized speaker from a plurality of speakers of which their voices are each present on the audio data over the sampling period, in response to word content of an audio input of the user reciting the name of the recognized speaker within a specified proximity to the capture signal word content.

19. The computer program product of claim 15, wherein the computer readable program code instructions for execution by the processor further cause the processor to:

define an audio boundary signal as an audio input into the microphone of a recitation by the user of word content that is different from the capture signal word content and is selected from the group consisting of another specific word, and another phrase of multiple words;

in response to an audio input of the user reciting the boundary signal word content into the microphone during the recording of the speech presentation and within a specified proximity in time to the time of the input of the capture signal word content, identify word content occurring after the boundary signal word content within the recording of the speech presentation as modifying word content; and review the recorded audio speech presentation to identify the recording portion start time as a point in time prior to the time of the input of the capture signal word content at which the modifying word content first occurs in the recording of the speech presentation.

20. The computer program product of claim 19, wherein the computer readable program code instructions for execution by the processor further cause the processor to:

analyze a sampling portion of the recorded audio speech presentation that occurs immediately previous in time to the time of the input of the capture signal word content to uniquely distinguish and recognize a speaker generating recorded audio speech data most recently prior to the time of the input of the capture signal word content, relative to speech data recorded from the user generating the capture signal and from any other speaking voices present on the audio data over the sampling period, wherein the recognized speaker is different from the user;

review the recorded audio speech presentation to identify a point in time that is prior to the time of the input of the capture signal word content at which the recognized speaker first started speaking; and identify the recording portion start time as the point in time at which the modifying word content first occurs in the recording of the speech presentation in response to determining that the point in time at which the recognized speaker first started speaking is subsequent in time to the point in time at which the modifying word content first occurs in the recording of the speech presentation.

* * * * *